No. 816,375. PATENTED MAR. 27, 1906.
W. H. PRATT.
ELECTRIC METER.
APPLICATION FILED JULY 25, 1904.
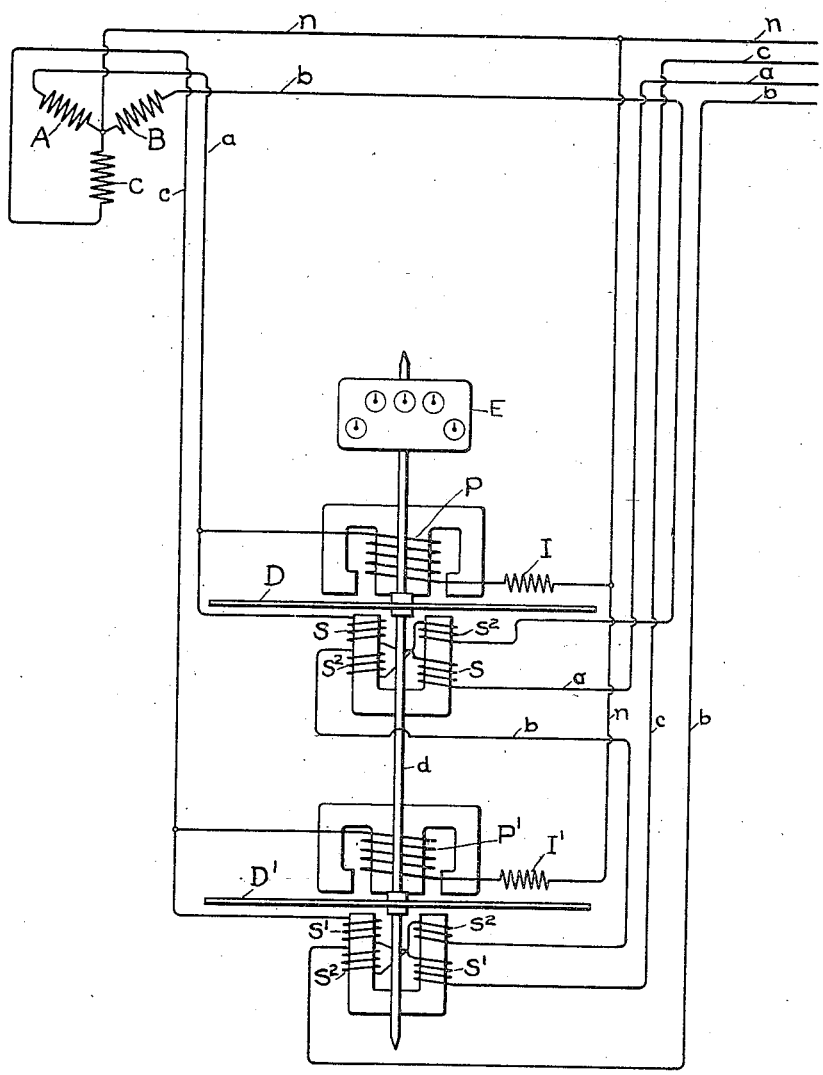
Witnesses
Irving E. Steers.
Helen Oxford
Inventor:
William H. Pratt,
By Albert G. Davis
Atty.

UNITED STATES PATENT OFFICE.

WILLIAM H. PRATT, OF LYNN, MASSACHUSETTS, ASSIGNOR TO GENERAL ELECTRIC COMPANY, A CORPORATION OF NEW YORK.

ELECTRIC METER.

No. 816,315.

Specification of Letters Patent.

Patented March 27, 1906.

Application filed July 25, 1904. Serial No. 217,998.

*To all whom it may concern:*

Be it known that I, WILLIAM H. PRATT, a citizen of the United States, residing at Lynn, in the county of Essex and State of Massachusetts, have invented certain new and useful Improvements in Electric Meters, of which the following is a specification.

My invention relates to the measurement of the energy in a four-wire three-phase system; and its object is to provide simple and efficient means for accurately measuring the energy in such a system.

In a four-wire three-phase system, or, in other words, a three-phase system employing a neutral, it is evident that the total power may be measured by means of three meters, each having its series coil connected in one of the phases and its potential-coil connected between that phase and the neutral. It is frequently desirable, however, to measure the entire energy of the system in a single meter. To accomplish this, it has been proposed heretofore to provide two instruments having their armatures mounted on the same shaft, so as to drive the same indicating means. The series coil of each instrument is supplied from the secondaries of two series transformers connected in two of the phases and has its potential-coil connected between one of those phases and the neutral. The other instrument has its potential-coil connected between the third phase and the neutral and its series coil energized from two series transformers, one connected in the third phase and the other connected in that one of the first two phases to which the first potential-coil is not connected. Such an arrangement is shown in Patent No. 716,867, issued December 30, 1902. With this arrangement each instrument measures not only the energy of the phase in which its potential-coil and one of the series transformers supplying its series coil are connected, but it also measures on balanced load one-half of the energy in the phase in which is connected the other series transformer supplying its series coil. The reason for this is that since the potential of any one phase of the three-phase system is equal to the resultant of the potentials of the other two phases measuring the current of one phase in combination with the potential of each of the other phases and adding the results by impressing both torques on the same shaft, gives a proper measurement of the total energy in that phase.

The arrangement outlined above, although it gives an accurate registration, requires the use of three series transformers, which add greatly to the expense of the meter.

The object of my invention is to provide means which shall accomplish the same result, but which renders unnecessary the employment of any series transformers.

My invention consists in providing each of the two instruments with two series coils instead of one and supplying the two series coils from different phases. The currents of the two phases are thus kept separate instead of being combined, and consequently no series transformers are required; but the magnetic effects of the two currents are combined so that the same result is obtained as in the arrangement heretofore proposed.

My invention will best be understood by reference to the accompanying drawing, which shows diagrammatically a meter arranged in accordance with my invention for measuring the energy of a three-phase four-wire system.

In the drawing, A, B, and C represent the three phases of any apparatus supplying power to or receiving power from the mains the energy in which it is desired to measure. These mains are indicated by the letters $a$, $b$, and $c$, corresponding to the three phases, and $n$ representing the neutral. The meter consists of two instruments the armatures of which, D and D', are mounted on the same shaft $d$ and drive the same registering means indicated at E. It will be understood that the instruments might be entirely separate, if preferred; but by mounting both armatures on the same shaft a single recording-dial suffices for both instruments. The upper instrument has its potential-coil P connected directly or through a transformer between the line-wire $a$ and the neutral $n$ with an impedance I in series with it for the purpose of adjusting the phase of the current therein. The two series coils S S are connected in series in the line-wire $a$. Consequently the potential-coil P and the series coils S S serve to measure the energy in phase A. In the same manner the lower instrument is provided with a potential-coil P', connected between line-wire $c$ and neutral $n$, and the two series coils S' S', connected in series with line-wire c. These coils consequently measure the energy of phase C. In order to measure the energy of phase B, two extra coils $S^2 S^2$ are provided for each meter, these coils being connected in series with line-wire b. The current in line-wire b is thus measured in combination with the potential between a and n and with the potential between c and n, and the two results are added. The sum of the two correctly gives the energy in phase B, as has been heretofore explained, since the potential between b and n is equal to the resultant of the potentials between a and n and c and n.

Although I have shown the coils applied to simple forms of magnetic circuits, it will be understood that my invention is not limited to any type of magnetic circuit, but may be used with any well-known form of meter. Both magnetic circuits may act on the same disk or on separate disks, as shown, and if separate the two disks may or may not be mounted on the same shaft. Accordingly, I do not desire to limit myself to the particular construction and arrangement of parts shown; but I aim in the appended claims to cover all modifications which are within the scope of my invention,

What I claim as new, and desire to secure by Letters Patent of the United States, is—

1. In a meter, in combination with a four-wire three-phase system, two field-windings connected respectively between two phases and the neutral, two field-windings connected in series with said phases respectively, and two field-windings both connected in series with the third phase.

2. In a meter, in combination with a four-wire three-phase system, two instruments each comprising two series windings connected in different phases, and one potential-winding connected to one of said phases, the potential-winding of each instrument being connected to the phase in which neither of the series coils of the other instrument is connected.

3. In a meter, in combination with a four-wire three-phase system, two instruments each comprising one potential-winding and two series windings, the potential-winding and one series winding of one instrument being connected in one phase, the potential-winding and one series winding of the other instrument being connected in a second phase, and the other series windings of both instruments being connected in the third phase.

4. In a meter, in combination with a four-wire three-phase system, two potential-windings connected respectively between two of the phases and the neutral, two series windings connected respectively in said phases, and two series windings both connected in the third phase.

In witness whereof I have hereunto set my hand this 20th day of July, 1904.

WILLIAM H. PRATT.

Witnesses:
DUGALD McK. McKILLOP,
JOHN A. McMANUS.